United States Patent [19]

Sakuragi

[11] Patent Number: 5,052,665

[45] Date of Patent: Oct. 1, 1991

[54] BUMPER RUBBER

[75] Inventor: Akihiko Sakuragi, Komaki, Japan

[73] Assignee: Tokai Rubber Industries, Ltd., Komaki, Japan

[21] Appl. No.: 540,225

[22] Filed: Jun. 19, 1990

[30] Foreign Application Priority Data

Jun. 22, 1989 [JP] Japan .................. 1-73437[U]

[51] Int. Cl.$^5$ .................. F16F 3/10; F16F 9/38
[52] U.S. Cl. .................. 267/220; 188/322.12; 267/122; 267/140; 267/152; 267/153; 267/293; 280/697; 403/51
[58] Field of Search ........... 267/220, 140, 153, 152, 267/122, 293; 188/322.12; 280/697; 403/50, 51, 134

[56] References Cited

U.S. PATENT DOCUMENTS

| | | | |
|---|---|---|---|
| 2,786,359 | 3/1957 | Karlan et al. | 403/50 |
| 4,235,426 | 11/1980 | Sullivan, Jr. et al. | 267/220 |
| 4,711,463 | 12/1987 | Knable et al. | 267/220 X |
| 4,712,775 | 12/1987 | Buma et al. | 267/220 |
| 4,804,169 | 2/1989 | Hassan | 267/220 |

FOREIGN PATENT DOCUMENTS

| | | | |
|---|---|---|---|
| 3716099 | 1/1988 | Fed. Rep. of Germany | 267/220 |
| 11006 | 9/1987 | Japan . | |
| 149608 | 9/1987 | Japan . | |

Primary Examiner—George A. Halvosa
Attorney, Agent, or Firm—Berman & Aisenberg

[57] ABSTRACT

A bumper rubber is disclosed and includes: a bumper rubber body being elastically deformable and having a substantially cylindrical shape, wherein the bumper rubber body is inserted into a rod extending from a top end portion of a cylinder of a shock absorber, a top end surface thereof is brought into contact with a bottom end portion of a suspension insulator disposed on a vehicle body, and a bottom end surface thereof is brought into contact with a top end portion of the cylinder, thereby being elastically deformed and absorbing the excessive displacements of the shock absorber; and a rigid ring integrally insert-molded on an outer periphery surface of the bumper rubber body and having an engagement groove on an exposed outer periphery surface thereof to be engaged with a dust cover, and the engagement groove going round on the exposed outer periphery surface of the rigid ring in a ring-like shape. Thus, the bumper rubber is hardly bent when the cylinder of the shock absorber is displaced excessively, because the bumper rubber has the pressing force of the cylinder of the shock absorber exerted to the whole of itself, thereby absorbing the excessive displacements. In addition, the bumper rubber can be securely engaged with the dust cover which protects the cylinder and the rod of the shock absorber when it is subjected to the vibrations and the deformations of the bumper rubber body caused by a traveling vehicle, because the dust cover is engaged with the engagement groove of the rigid ring which is free from the elastic deformation.

8 Claims, 2 Drawing Sheets

BUMPER RUBBER

BACKGROUND OF THE INVENTION

1. Field of the Invention

The present invention relates to a bumper rubber provided in a suspension mechanism of a vehicle, and more particularly an improvement on a bumper rubber to be engaged with a dust cover.

2. Description of the Prior Art

In a suspension mechanism for a vehicle supporting its body by way of a shock absorber, an elastic body so called a bumper rubber is generally provided therein in order to elastically relieve the excessive displacements of the shock absorber. The bumper rubber has a substantially cylindrical shape, and is inserted into a rod extending from a top end portion of a cylinder of the shock absorber, a top end surface thereof is brought into contact with a bottom end portion of a suspension insulator disposed on a vehicle body, and a bottom end surface thereof is brought into contact with a top end portion of the cylinder, thereby being elastically deformed.

As disclosed in Japanese Unexamined Utility Model Publication (KOKAI) No. 11006/1987, a bumper rubber has been known which includes a bumper rubber body being elastically deformable and having a substantially cylindrical shape, and a ring made of a rigid material and provided integrally on an outer periphery surface of the bumper rubber body. In this bumper rubber, the ring made of a rigid body is provided in order to prevent the bumper rubber from being bent and have the pressing force of the shock absorber exerted on the whole of the bumper rubber when the shock absorber is displaced excessively.

By the way, the bumper rubber may be provided with a dust cover for covering and protecting the cylinder and the rod of the shock absorber during the travelling of the vehicle. Japanese Unexamined Utility Model Publication (KOKAI) No. 149608/1987 discloses such a bumper rubber to be provided and engaged with a dust cover. In this bumper rubber, the dust cover is engaged with a groove formed on an elastically deformable bumper rubber body of a substantially cylindrical shape, and the groove going round on an outer periphery of the bumper rubber body in a ring-like shape.

The bumper rubber disclosed in Japanese Unexamined Utility Model Publication (KOKAI) No. 11006/1987 has the following good performances. Namely, when the shock absorber is displaced excessively, the bumper rubber does not bend, but the whole of the bumper rubber receives and absorbs the displacements because the bumper rubber body is provided with the rigid ring. However, the bumper rubber has a problem in the protection of the cylinder and the rod of the shock absorber because it is not provided with a dust cover.

On the contrary, the bumper rubber disclosed in Japanese Examined Utility Model Publication (KOKAI) No. 149608/1987 is likely to bend when relieving the displacements of the shock absorber because it is made of the substantially cylindrical and elastically deformable bumper rubber body only. Moreover, in this conventional bumper rubber, the dust cover is engaged with the elastically deformable bumper rubber body, the engagement between the dust cover and the bumper rubber body is accordingly liable to disengage due to the vibrations and the deformations of the bumper rubber body during the travelling of a vehicle.

SUMMARY OF THE INVENTION

The present invention has been developed in view of the above-mentioned problems of the conventional bumper rubbers. It is therefore an object of the present invention to provide a bumper rubber being free from the bent problem at the time of the excessive displacements of the shock absorber and having an excellent performance in the engagement with the dust cover.

The above and other objects can be carried out by a bumper rubber according to the present invention. The bumper rubber comprises: a bumper rubber body being elastically deformable and having a substantially cylindrical shape, wherein the bumper rubber body is inserted into a rod extending from a top end portion of a cylinder of a shock absorber, a top end surface thereof is brought into contact with a bottom end portion of a suspension insulator disposed on a vehicle body, and a bottom end surface thereof is brought into contact with a top end portion of the cylinder, thereby being elastically deformed and absorbing the excessive displacements of the shock absorber; and a rigid ring integrally insert-molded on an outer periphery surface of the bumper rubber body and having an engagement groove on an exposed outer periphery surface thereof to be engaged with a dust cover, and the engagement groove going round on the exposed outer periphery surface of the rigid ring in a ring-like shape.

The bumper rubber comprises the bumper rubber body and the rigid ring.

The bumper rubber body is made of an elastic material such as rubber and the like, and has a substantially cylindrical shape. The bumper rubber body is inserted into a rod extending from the top end portion of a cylinder of a shock absorber, the top end surface thereof is brought into contact with the bottom end portion of a suspension insulator disposed on a vehicle body, and the bottom end surface thereof is brought into contact with the top end portion of the cylinder, thereby being elastically deformed.

It is preferable to form the outer periphery of the bumper rubber body in a bellows shape. In addition, it is preferable to form the outer periphery so that its thickness increases as it starts at the bottom end surface of the bumper rubber body and ends at the top end surface thereof. Both of the arrangements give the bumper rubber body an excellent capability in relieving the displacements of the shock absorber. Further, it is preferable to provide an air vent groove on the bottom end surface of the bumper rubber body, whereby the air remaining in the inside of the bumper rubber body can be evacuated when the bottom end surface thereof is brought into contact with the top end portion of the cylinder of the shock absorber. Furthermore, a positioning groove for positioning the suspension insulator may be provided on the top end surface of the bumper rubber body.

The rigid ring is molded in advance out of a rigid material such as thermosetting resin, thermoplastic resin having a softening temperature higher than a vulcanization temperature, metal and the like, and the engagement groove going round the rigid ring in a ring-like shape is formed in advance on the outer periphery surface of the rigid ring in an engraving manner. The rigid ring is insert-molded integrally on the outer periphery surface of the bumper rubber body. In other words, when insert-molding, the rigid ring is engaged with a retainer and the like, and then positioned and set at a predetermined position in a mold. Thereafter, a raw material or unvulcanized rubber is injected into and vulcanized in the mold. The engagement groove of the rigid ring is engaged with the dust cover when providing the bumper rubber in a suspension mechanism of a vehicle.

In addition, the bottom surface of the rigid ring may be made into and worked as the bottom end surface of the bumper rubber body by insert-molding the rigid ring at the lowest portion of the bumper rubber body. This arrangement is believed to have the pressing force of the cylinder further exerted on the whole of the bumper rubber. If such is the case, it is preferred to provide an air vent groove on the bottom end surface of the rigid ring.

According to the bumper rubber of the present invention, the bottom end surface of the bumper rubber body is brought into contact with the top end portion of the cylinder of the shock absorber when the shock absorber is displaced excessively, whereby the bumper rubber body is deformed elastically to relieve the excessive displacements of the shock absorber. At this moment, the rigid ring prevents the bumper rubber body from being bent, and has the pressing force of the cylinder exerted on the whole of the bumper rubber.

Further, in the bumper rubber of the present invention, the dust cover hardly disengages from the rigid ring when it is subjected to the vibrations and the deformations of the bumper rubber during the travelling of a vehicle, because the dust cover is engaged with the engagement groove of the rigid ring which is not deformed elastically. As a result, the dust cover comes to be hardly removed from the bumper rubber during the travelling of a vehicle according to the bumper rubber of the present invention.

In addition, in the bumper rubber of the present invention, the rigid ring is positioned and held in a mold with the engagement groove thereof formed in advance. Hence, the rigid ring does not deviate in the horizontal directions or the vertical directions with respect to the bumper rubber body, and accordingly it can be integrated at a precise position on the outer periphery surface of the bumper rubber body. Therefore, the dust cover comes to be engaged with the rigid ring integrated at the precise position. Whereby the engagement of the dust cover is further stabilized and the dust cover is made unremovable from the bumper rubber against the vibrations and the elastic deformations of the bumper rubber during of the travelling of a vehicle.

As detailed so far, the bumper rubber of the present invention comprises: a bumper rubber body being elastically deformable and having a substantially cylindrical shape; and a rigid ring insert-molded on the outer periphery surface of the bumper rubber body and having an engagement groove on an exposed outer periphery surface thereof to be engaged with a dust cover, and the engagement groove going round on the exposed outer periphery surface of the rigid ring in a ring-like shape.

Thus, the bumper rubber of the present invention can have the pressing force of the cylinder of the shock absorber exerted to the whole of itself and absorb the excessive displacements thereof without being bent when the shock absorber is displaced excessively. In addition, the bumper rubber can be securely engaged with the dust cover which protects the cylinder and the rod of the shock absorber effectively.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT OF THE INVENTION

Having generally described the present invention, a further understanding can be obtained by reference to a certain specific preferred embodiment which is provided herein for purposes of illustration only and are not intended to be limiting unless otherwise specified.

A bumper rubber of a preferred embodiment according to the present invention will be hereinafter described with reference to the accompanying drawings. The bumper rubber 1 of the preferred embodiment comprises a bumper rubber body 2 made of a natural rubber, and a rigid ring 3 made of a nylon 6, 6.

Figure 1:
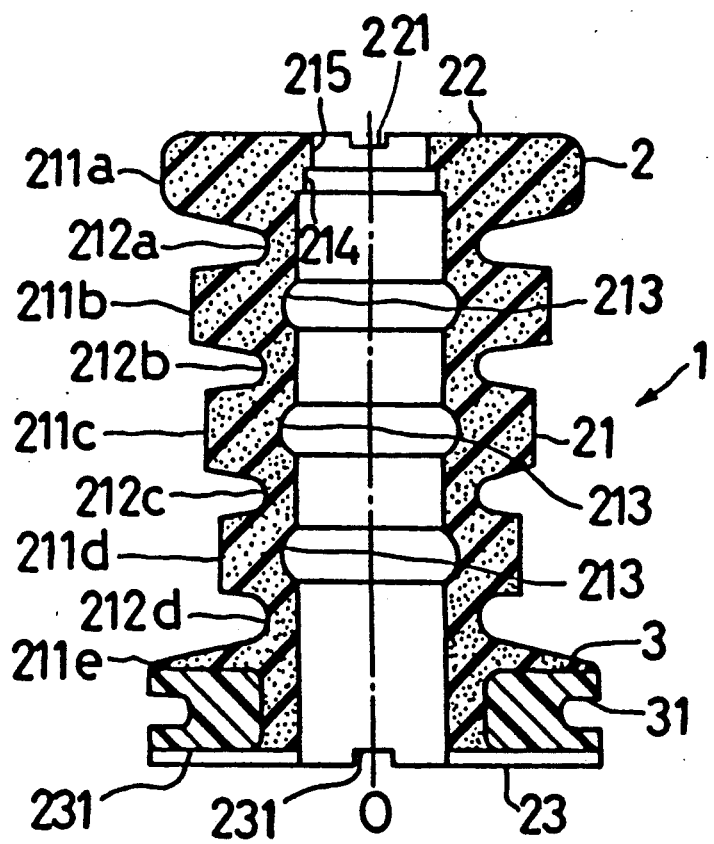
FIG. 1 is a vertical cross sectional view of a bumper rubber of a preferred embodiment according to the present invention.
Figure 2:
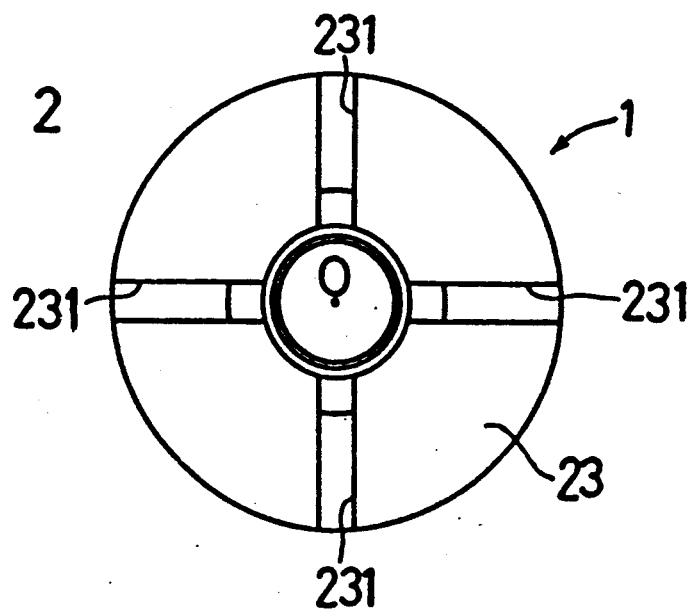
FIG. 2 is a bottom view of the bumper rubber thereof.

As illustrated in the cross sectional view of FIG. 1 and the bottom view of FIG. 2, the bumper rubber body 2 is elastically deformable, and has a substantially cylindrical shape. The bumper rubber body 2 comprises a cylindrical portion 21 defining the outer periphery thereof, a ring-shaped top end surface 22 defining the top end surface of the cylindrical portion 21, and a ring-shaped bottom end surface 23 defining the bottom end surface of the cylindrical portion 21. Further, a positioning groove 221 is formed on the ring-shaped top end surface 22 for positioning the bumper rubber with respect to a suspension insulator 6.

The cylindrical portion 21 is formed in a bellows shape. Namely, the outer periphery portion of the cylindrical portion 21 has 5 projections 211a through 211e formed in a ring-like shape around the axis "O" of the cylindrical portion 21, and 4 groves 212a through 212d formed in a ring-like shape around the axis "O" of the cylindrical portion 21 between the projections 212a and 211e. The projection 211b has a radius starting at the axis "O" smaller than that of the projection 211a, the projection 211c has a radius starting at the axis "O" smaller than that of the projection 211b, the projection 211d has a radius starting at the axis "O" smaller than that of the 211c, but the projection 211e has a radius starting at the axis "O" larger than that of the projection 211a. On the outer periphery surface of the projection 211e, the rigid ring 3 later described is insert-molded.

Further, the grooves 212a through 212d are so formed that they have an equal radius starting at the axis "O." Furthermore, the inside of the cylindrical portion 21 is in a shape which is bored through in a substantially equal radius starting at the axis "O." However, grooves 213 are formed on the insides of the projec ions 211b, 211c and 211d in an equal radius starting at the axis "O," and stepped portions 214 and 215 whose radii starting at the axis "O" are reduced in two-stage are formed on the inside of the projection 211a. Finally, as illustrated in the bottom view of FIG. 2, air vent grooves 231 intersecting with each other in a cross-like shape are formed on the bottom end surface 23 of the bumper rubber body 2.

Figure 3:
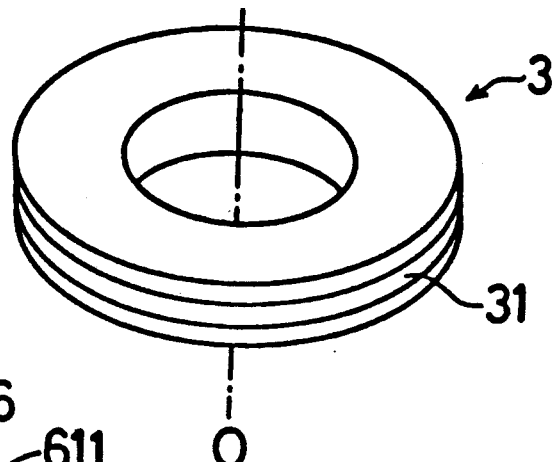
FIG. 3 is a perspective view of a rigid ring of the bumper rubber thereof.

As illustrated in FIGS. 1 and 3, the rigid ring 3 is one formed in a ring-like shape in advance. The rigid ring 3 has a radius starting at the axis "O" larger than the radius of the inner periphery of the bumper rubber body 2, and has an engagement groove 31 going round on the outer periphery surface thereof in a ring-like shape. The engagement groove 31 is one formed in advance, and used also for positioning the rigid ring 3 in a mold during the insert-molding. In other words, the insert-molding is carried out as follows: After the rigid ring 3 is positioned and held in a mold (not shown) by engaging a retainer and the like with the engagement groove 31, a raw material of unvulcanized rubber is injected into and vulcanized in the mold, whereby the bumper rubber 1 can be manufactured. As a result, in the bumper rubber 1 of the preferred embodiment, the rigid ring 3 does not deviate in the horizontal directions or the vertical directions with respect to the bumper rubber body 2, and accordingly it can be integrated precisely on the outer periphery surface of the projection 211e of the bumper rubber body 2.

Figure 4:
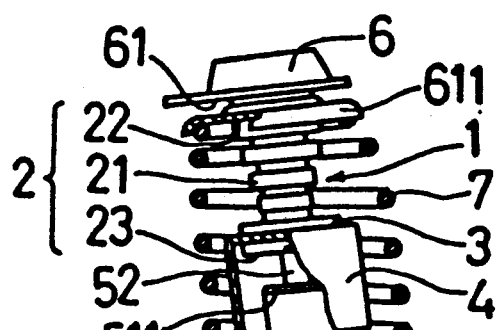
FIG. 4 is a front view of a suspension mechanism provided with the bumper rubber thereof.

As illustrated in FIG. 4, the bumper rubber 1 constitutes a suspension mechanism of a vehicle. More precisely, the bumper rubber 1 is inserted into a rod 52 extending from a top end portion 511 of a cylinder 51 of a shock absorber 5 disposed on an axle shaft. When the bumper rubber 1 is inserted thereinto, a top end surface 22 of the bumper rubber body 2 is brought into contact with a spring seat 611 disposed on a bottom end portion 61 of a suspension insulator 6. Further, the bottom end surface 23 of the bumper rubber body 2 is normally spaced away from a top end portion 511 of the cylinder 51 by a predetermined interval. Besides, the engagement groove 31 of the rigid ring 3 is engaged with a dust cover 4 made of rubber and the like. Here, a coil spring 7 is provided between a spring seat 513 fixed on the cylinder 51 and the spring seat 611.

In the suspension mechanism with the bumper rubber 1 thus provided, when the shock absorber 5 is displaced by a small degree, the displacement thereof is absorbed by the deformations of the cylinder 51 and the coil spring 7. When the shock absorber 5 is displaced by an excessive degree, the bottom end surface 23 of the bumper rubber body 2 is brought into contact with the top end portion 511 of the cylinder 51, the bumper rubber body 2 is elastically deformed in accordance with the bellows shape of the cylinder portion 21 thereof, thereby absorbing the excessive displacements of the shock absorber 5. At this moment, as readily understood from FIG. 1, the rigid ring 3 deforms the bellows shape of the cylinder portion 21 of the bumper rubber body 2 in succession. Namely, as illustrated in FIG. 1, the rigid ring 3 transmits the pressing force of the top end portion of the cylinder 51 applied thereto consequently to the groove 212a between the projections 211b and 211a by way of the groove 212d between the projections 211e and 211d, the groove 212c between the projections 211d and 211c and the groove 212b between the projections 211c and 211b in this order. Thus, when the pressing force is exerted to the rigid ring 3 from the top end portion 511 of the cylinder 51, the rigid ring 3 has the pressing forces exerted to the whole of the bumper rubber 1. In addition, when the top end portion 511 of the cylinder 51 is brought into contact with the bottom end surface 23 of the bumper rubber body 2 of the bumper rubber 1, the air remaining in the bumper rubber 1 is evacuated through the air vent grooves 231.

In the bumper rubber 1 of the preferred embodiment, even when a travelling vehicle causes the vibrations and the deformations of the bumper rubber body 2, the dust cover 4 is firmly engaged with the rigid ring 3, because the dust cover 4 is engaged with the engagement groove 31 of the rigid ring 3 which is not deformed elastically. As a result, in the bumper rubber 1 thereof, the dust cover 4 hardly disengages from the bumper rubber 1 when a vehicle is travelling. In addition, in the bumper rubber 1 thereof, it is further hard to disengage the engagement of the dust cover 4 with the bumper rubber body 2 of the bumper rubber 1 by the vibrations and the elastic deformations of the bumper rubber body 2 resulting from a travelling vehicle, because the rigid ring 3 is precisely integrated with respect to the bumper rubber body 2 of the bumper rubber 1 and the dust cover 4 is engaged with the engagement groove 31 of the rigid ring 3. The bumper rubber 1 of the preferred embodiment and the dust cover 4 thus protect the cylinder 51 and the rod 52 of the shock absorber 5 effectively.

Having now fully described the present invention, it will be apparent to one of ordinary skill in the art that many changes and modifications can be made thereto without departing from the spirit or scope of the present invention as set forth herein.

What is claimed is:

1. A bumper rubber comprising:
    an elastically deformable bumper rubber body having a substantially cylindrical shape, disposed around a rod extending from a top end portion of a cylinder of a shock absorber and between said top end portion of said cylinder and a bottom end portion of a suspension insulator disposed on a vehicle body, a top end surface of said bumper rubber body being brought into contact with said bottom end portion of said suspension insulator, and a bottom end surface of said bumper rubber body being normally spaced away from said top end of said cylinder and being brought into contact with said top end portion of said cylinder when said shock absorber is fully compressed, thereby being elastically deformed and absorbing the excessive displacements of said shock absorber; and
    a rigid ring disposed on an outer periphery surface of said bumper rubber body integrally with said bumper rubber body by insert-molding and having an engagement groove on an exposed outer periphery surface thereof, said engagement groove to be engaged with a dust cover, said dust cover covering an upper portion of said rod and an upper portion of said cylinder and disposed around said cylinder coaxially with and relatively movably together with said bumper rubber body in an axial direction of said cylinder, said engagement groove extending around said exposed outer periphery surface of said rigid ring in a ring-like shape.

2. The bumper rubber according to claim 1, wherein said bumper rubber body has a bellows shape.

3. The bumper rubber according to claim 1, wherein said bumper rubber body has an outer periphery surface of increasing thickness starting at said bottom end surface thereof and ending at said top end surface thereof.

4. The bumper rubber according to claim 1, wherein said bumper rubber further comprising an air vent groove formed on said bottom end surface of said bumper rubber body.

5. The bumper rubber according to claim 1, wherein said bumper rubber further comprising a positioning groove for positioning said suspension insulator formed on said top end surface of said bumper rubber body.

6. The bumper rubber according to claim 1, wherein said rigid ring is made of at least one selected from the group consisting of thermosetting resin, thermoplastic resin having a softening temperature higher than a vulcanization temperature and metal.

7. The bumper rubber according to claim 1, wherein said rigid ring is disposed at the bottom end portion of said bumper rubber body integrally with said bumper rubber body by insert-molding.

8. The bumper rubber according to claim 7, wherein said rigid ring further comprising an air vent groove formed on the bottom end surface thereof.

* * * * *